(12) United States Patent
Hunts et al.

(10) Patent No.: US 8,924,891 B2
(45) Date of Patent: *Dec. 30, 2014

(54) METHOD AND SYSTEM FOR PROVIDING ISOLATED DETAIL INFORMATION ABOUT STATIONS WHICH ARE SIMULTANEOUSLY ACTIVE IN AN IRRIGATION SYSTEM

(75) Inventors: David Hunts, Murrieta, CA (US); Brian J. Smith, Aliso Viejo, CA (US)

(73) Assignee: Signature Control Systems, Inc., Irvine, CA (US)

( * ) Notice: Subject to any disclaimer, the term of this patent is extended or adjusted under 35 U.S.C. 154(b) by 387 days.

This patent is subject to a terminal disclaimer.

(21) Appl. No.: 13/490,659

(22) Filed: Jun. 7, 2012

(65) Prior Publication Data

US 2012/0245866 A1 Sep. 27, 2012

Related U.S. Application Data

(63) Continuation of application No. 12/213,716, filed on Jun. 24, 2008.

(51) Int. Cl.
  *G06F 3/048* (2013.01)
  *G05D 11/00* (2006.01)
  *A01G 25/16* (2006.01)

(52) U.S. Cl.
  CPC .................................. *A01G 25/167* (2013.01)
  USPC .......................................... 715/859; 700/284

(58) Field of Classification Search
  USPC .......................................... 715/859; 700/284
  See application file for complete search history.

(56) References Cited

U.S. PATENT DOCUMENTS

| | | | |
|---|---|---|---|
| 5,023,787 A | 6/1991 | Evelyn-Veere | |
| 5,225,997 A | 7/1993 | Lederer et al. | |
| 5,740,031 A | 4/1998 | Gagnon | |
| 6,600,971 B1 | 7/2003 | Smith et al. | |
| 6,775,576 B2 | 8/2004 | Spriggs et al. | |
| 6,823,239 B2 | 11/2004 | Sieminski | |
| 7,010,395 B1 | 3/2006 | Goldberg et al. | |
| 7,168,045 B2 | 1/2007 | Fliess et al. | |
| 7,515,977 B2 | 4/2009 | Eryurek et al. | |
| 7,584,023 B1 | 9/2009 | Palmer et al. | |
| 2003/0105535 A1 | 6/2003 | Rammler | |
| 2005/0121536 A1 | 6/2005 | Bavel | |
| 2006/0190236 A1 | 8/2006 | Malloy et al. | |
| 2007/0132779 A1 | 6/2007 | Gilbert et al. | |
| 2008/0006535 A1 | 1/2008 | Paik et al. | |
| 2008/0034329 A1 | 2/2008 | Posner et al. | |
| 2008/0063363 A1 | 3/2008 | Kientz et al. | |
| 2008/0244449 A1 | 10/2008 | Morrison et al. | |
| 2009/0006018 A1 | 1/2009 | Hutchins et al. | |
| 2009/0099701 A1 | 4/2009 | Li et al. | |

*Primary Examiner* — Doon Chow
*Assistant Examiner* — Wilson Varga
(74) *Attorney, Agent, or Firm* — Posz Law Group, PLC

(57) ABSTRACT

A method provides information about stations in an irrigation system which are simultaneously active. An irrigation flow curve image is displayed which summarizes flow information for an irrigation system. The method interacts with a user to receive an indication from a user interface pointing device of a position within a flow curve area of the irrigation flow curve image on the display. The method retrieves detail information for stations in the irrigation system which are simultaneously active at a time indicated by the position of the user interface pointing device. Detail information is displayed isolating the stations in the irrigation system which are simultaneously active at the time indicated by the position of the user interface pointing device, wherein the detail information further individually indicates irrigation activity for stations which are simultaneously active at the time indicated by the position of the user interface pointing device.

12 Claims, 9 Drawing Sheets

| | Start Time | End Time | Duration | Flow by Start Time | Common Watering Profile | Mouse Over Flow Details |
|---|---|---|---|---|---|---|

| | Sat-171... | Sat-172... | Sat-174... | Sat-192... |
|---|---|---|---|---|
| Station 5 | | | | 20:10:00 |
| Station 6 | | | | 20:10:00 |
| Station 8 | | | | 20:10:00 |
| Station 9 | | | | 20:10:00 |
| Station 10 | | | | 20:10:00 |
| Station 11 | | | | 20:10:00 |
| Station 18 | | 20:10:00 | | |
| Station 20 | | | 20:10:00 | |
| Station 22 | | | 20:10:00 | |
| Station 25 | | | 20:10:00 | |
| Station 27 | | 20:10:00 | | |
| Station 31 | | 20:10:00 | | |
| Station 34 | 20:10:00 | | 20:10:00 | |
| Station 35 | 20:10:00 | | | |
| Station 38 | | 20:10:00 | | |
| Station 39 | | 20:10:00 | | |
| Station 40 | 20:10:00 | 20:10:00 | | |
| Station 41 | 20:10:00 | 20:10:00 | | |
| Station 42 | 20:10:00 | | | |
| Station 46 | 20:10:00 | | | |
| Station 47 | 20:10:00 | 20:10:00 | | |
| Station 48 | | 20:10:00 | | |
| Station 49 | 20:10:00 | | | |
| Station 52 | 20:10:00 | 20:10:00 | | |
| Station 53 | 20:10:00 | | | |
| Station 54 | 20:10:00 | | | |
| Station 56 | 20:10:00 | | | |
| Station 76 | | | | 20:10:00 |
| Station 77 | | | | 20:10:00 |

FIG. 5

| WATERING SCHEDULE | |
| --- | --- |
| STATION (SATELLITE #, STATION #) | IRRIGATION START, STOP, DURATION |
| . . . | |
| SATELLITE # 171, STATION # 30 | 20:00:00 20:05:00, 05:00 |
| SATELLITE # 171, STATION # 31 | 20:00:00 20:05:00, 05:00 |
| SATELLITE # 171, STATION # 32 | 20:00:00 20:05:00, 05:00 |
| SATELLITE # 171, STATION # 33 | 20:00:00 20:05:00, 05:00 |
| SATELLITE # 171, STATION # 34 | 20:10:00 20:20:00, 10:00 |
| SATELLITE # 171, STATION # 35 | 20:10:00 20:20:00, 10:00 |
| SATELLITE # 171, STATION # 36 | 20:20:00 20:30:00, 05:00 |
| SATELLITE # 171, STATION # 37 | 20:20:00 20:35:00, 10:00 |
| SATELLITE # 171, STATION # 38 | 20:20:00 20:25:00, 05:00 |
| SATELLITE # 171, STATION # 39 | 20:25:00 20:35:00, 10:00 |
| SATELLITE # 171, STATION # 40 | 20:10:00 20:20:00, 10:00 |
| SATELLITE # 171, STATION # 41 | 20:10:00 20:20:00, 10:00 |
| SATELLITE # 172, STATION # 42 | 20:10:00 20:20:00, 10:00 |
| SATELLITE # 172, STATION # 43 | 20:00:00 20:05:00, 05:00 |
| SATELLITE # 172, STATION # 44 | 20:00:00 20:05:00, 05:00 |
| SATELLITE # 172, STATION # 45 | 20:00:00 20:05:00, 05:00 |
| . . . | |

*FIG. 7*

| LIST OF RUNTIMES |||
| --- | --- | --- |
| RUNTIME | IRRIGATION START, STOP, DURATION | STATION (SATELLITE #, STATION #) |
| . . . |||
| 20:15:00 | 20:10:00 20:20:00, 10:00 | SATELLITE # 171, STATION # 34 |
| 20:15:00 | 20:10:00 20:20:00, 10:00 | SATELLITE # 171, STATION # 35 |
| 20:15:00 | 20:10:00 20:20:00, 10:00 | SATELLITE # 171, STATION # 40 |
| 20:15:00 | 20:10:00 20:20:00, 10:00 | SATELLITE # 171, STATION # 41 |
| 20:15:00 | 20:10:00 20:20:00, 10:00 | SATELLITE # 171, STATION # 42 |
| 20:15:00 | 20:10:00 20:20:00, 10:00 | SATELLITE # 171, STATION # 46 |
| 20:15:00 | 20:10:00 20:20:00, 10:00 | SATELLITE # 171, STATION # 47 |
| 20:15:00 | 20:10:00 20:20:00, 10:00 | SATELLITE # 171, STATION # 49 |
| 20:15:00 | 20:10:00 20:20:00, 10:00 | SATELLITE # 171, STATION # 52 |
| 20:15:00 | 20:10:00 20:20:00, 10:00 | SATELLITE # 171, STATION # 53 |
| 20:15:00 | 20:10:00 20:20:00, 10:00 | SATELLITE # 171, STATION # 54 |
| 20:15:00 | 20:10:00 20:20:00, 10:00 | SATELLITE # 171, STATION # 56 |
| 20:15:00 | 20:10:00 20:20:00, 10:00 | SATELLITE # 172, STATION # 18 |
| 20:15:00 | 20:10:00 20:20:00, 10:00 | SATELLITE # 172, STATION # 27 |
| 20:15:00 | 20:10:00 20:20:00, 10:00 | SATELLITE # 172, STATION # 31 |
| 20:15:00 | 20:10:00 20:20:00, 10:00 | SATELLITE # 172, STATION # 38 |
| . . . |||

*FIG. 8*

| LIST OF RUNTIMES ||| 
| --- | --- | --- |
| RUNTIME | IRRIGATION START, STOP, DURATION | STATION (SATELLITE #, STATION #) |
| ... |||
| 20:10:00 | 20:10:00 20:20:00, 10:00 | SATELLITE # 171, STATION # 34 |
| 20:10:00 | 20:10:00 20:20:00, 10:00 | SATELLITE # 171, STATION # 35 |
| ... |||
| 20:10:01 | 20:10:00 20:20:00, 10:00 | SATELLITE # 171, STATION # 34 |
| 20:10:01 | 20:10:00 20:20:00, 10:00 | SATELLITE # 171, STATION # 35 |
| ... |||
| 20:10:02 | 20:10:00 20:20:00, 10:00 | SATELLITE # 171, STATION # 34 |
| 20:10:02 | 20:10:00 20:20:00, 10:00 | SATELLITE # 171, STATION # 35 |
| ... |||

*FIG. 9*

METHOD AND SYSTEM FOR PROVIDING ISOLATED DETAIL INFORMATION ABOUT STATIONS WHICH ARE SIMULTANEOUSLY ACTIVE IN AN IRRIGATION SYSTEM

This application is a continuation application of U.S. application Ser. No. 12/213,716, which was filed on Jun. 24, 2008, which is expressly incorporated herein by reference.

BACKGROUND OF THE INVENTION

1. Field of the Invention

The present invention relates to systems for irrigation management and control. More particularly, the present invention relates to interacting with a user to provide information relating to scheduling irrigation equipment in an irrigation system.

2. Description of the Related Art

A modern irrigation system is designed to execute a predetermined irrigation schedule. The purpose of irrigation scheduling is to determine the exact amount of water to be applied and the exact timing for application. For example, a golf course irrigation management program will include a week-by-week irrigation schedule outlining irrigation frequency, volume and duration.

Many methods can be used to help managers of golf courses, parks, and other landscapes to develop plans for determining when to irrigate and how much water to apply. Current technology allows the irrigation schedule to be particularized for individual sprinklers, irrigation controllers, and/or stations on the irrigation controllers in the irrigation system. In addition, parts of irrigation schedules can be downloaded to intelligent irrigation controllers.

BRIEF DESCRIPTION OF THE SEVERAL VIEWS OF THE DRAWING(S)

The accompanying figures where like reference numerals refer to identical or functionally similar elements and which together with the detailed description below are incorporated in and form part of the specification, serve to further illustrate an exemplary embodiment and to explain various principles and advantages in accordance with the present invention.

FIG. 5 is an illustration of a detail information portion of the user interface of FIG. 2;

FIG. 7 is an illustration of part of a watering schedule relating to the user interface of FIG. 2;

FIG. 8 is an illustration of a list of runtimes for the watering schedule;

FIG. 9 is another illustration of the list of runtimes for the watering schedule.

DETAILED DESCRIPTION

Figure 1:
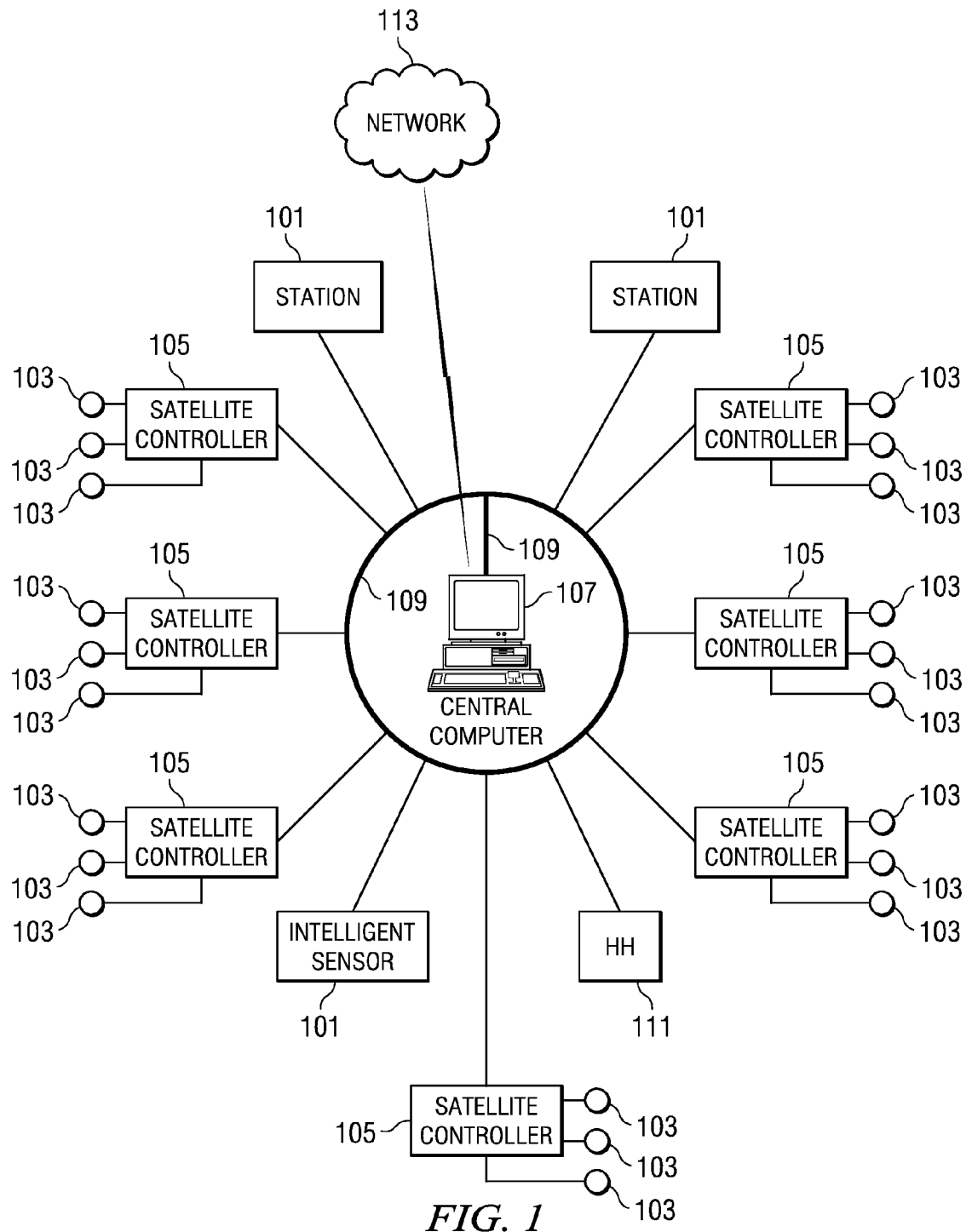
FIG. 1 is a block diagram of a representative irrigation system.

In overview, the present disclosure concerns irrigation systems comprising irrigation controllers and irrigation stations, and the like having a capability to control irrigation in accordance with irrigation schedules. Such irrigation systems may further be connected electrically, electronically or mechanically to irrigation devices such as sprinklers or the like for applying water according to an irrigation schedule, may be controlled by and/or report to a computer system, and may receive and/or transmit message in accordance with a communication network and/or computer network. More particularly, various inventive concepts and principles are embodied in computer systems related to irrigation systems, irrigation controllers, stations, and parts thereof, and/or methods therein for providing information about the irrigation system and the irrigation schedule.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore or application specific ICs. The processor can be, for example, a general purpose computer, can be a specially programmed special purpose computer, can include a distributed computer system, and/or can include embedded computer processors. Similarly, the processing could be controlled by software instructions on one or more computer systems or processors, or could be partially or wholly implemented in hardware. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the preferred embodiments.

As further discussed herein below, various inventive principles and combinations thereof are advantageously employed to enable a user, such as a golf irrigation specialist, to instantly view irrigation controllers and stations which are simultaneously active at a given instance in time, from a list of irrigation runtimes for the stations. A golf irrigation specialist can quickly understand and see when their equipment will be used to irrigate the golf course for which they are responsible by providing run start times, durations, and water flow amounts.

It is known how to provide a flow curve image displayed on a grid. It is also known to provide a display of an irrigation schedule. Various embodiments can provide an understandable way to tie the detail information in an irrigation schedule and the flow curves together. By positioning a user interface pointing device such as a mouse over the flow curve, individual irrigation equipment which is simultaneously at that time can be shown. In addition, the flow curve can be displayed in comparison to available water.

The system and method described herein solve the problem of tying the irrigation schedule information together to ensure that the best use of irrigation equipment and water resources is being made, to manage irrigation equipment in a cognitive and effective way. The problem has been to effectively relate a graphic curve image to the detail information used to create the flow curve. A list is developed which includes detail information sorted by runtime, resulting in chronological groupings of simultaneously active stations. By using a pointing device such as a computer mouse to mouse-over the curve, which shows flow vs. time, the time of interest is obtained, and the detail information for all individual stations that are active at the time of interest is provided.

Referring now to FIG. 1, a representative irrigation system will be discussed and described. The irrigation system includes a one or more irrigation stations 101, 103, one or more irrigation satellites 105, a remote hand-held device (HH) 111, and a central computer 107. The central computer 107 and/or hand-held remote device 111 are optional and can be omitted. The irrigation stations 101, 103 and irrigation satellites 105 can be connected to one another and to the central computer 107 and remote hand-held device 111 via a communication bus 109.

Each irrigation satellite 105 can include one or more irrigation stations 103. A conventional irrigation satellite 105 can control up to eighty irrigation stations 103. An irrigation system can include up to several thousand irrigation satellites 105. In practice, an irrigation system can include thousands of individual irrigation stations 101, 103.

The irrigation satellites 105 can be operated locally or remotely from another irrigation satellite 105, the hand-held device 111, and/or the central computer 107 in the irrigation system or over a network 113 such as the Internet or an intranet or cellular network, to create and manage irrigation schedules.

Although the illustrated irrigation system is a peer-to-peer system, it will be appreciated that this is representative of other types of irrigation systems that can be used. Also, it will be appreciated that an irrigation system can include more or fewer satellite controllers 105 and irrigation stations 101, 103 than are illustrated. In addition, the central computer 107 and/or hand-held device 111 can be omitted. Furthermore, although the computer system is illustrated as a central computer 107 and/or a hand-held device 111, it will be appreciated that there are other embodiments of the computer system encompassed by the description herein.

Figure 2:
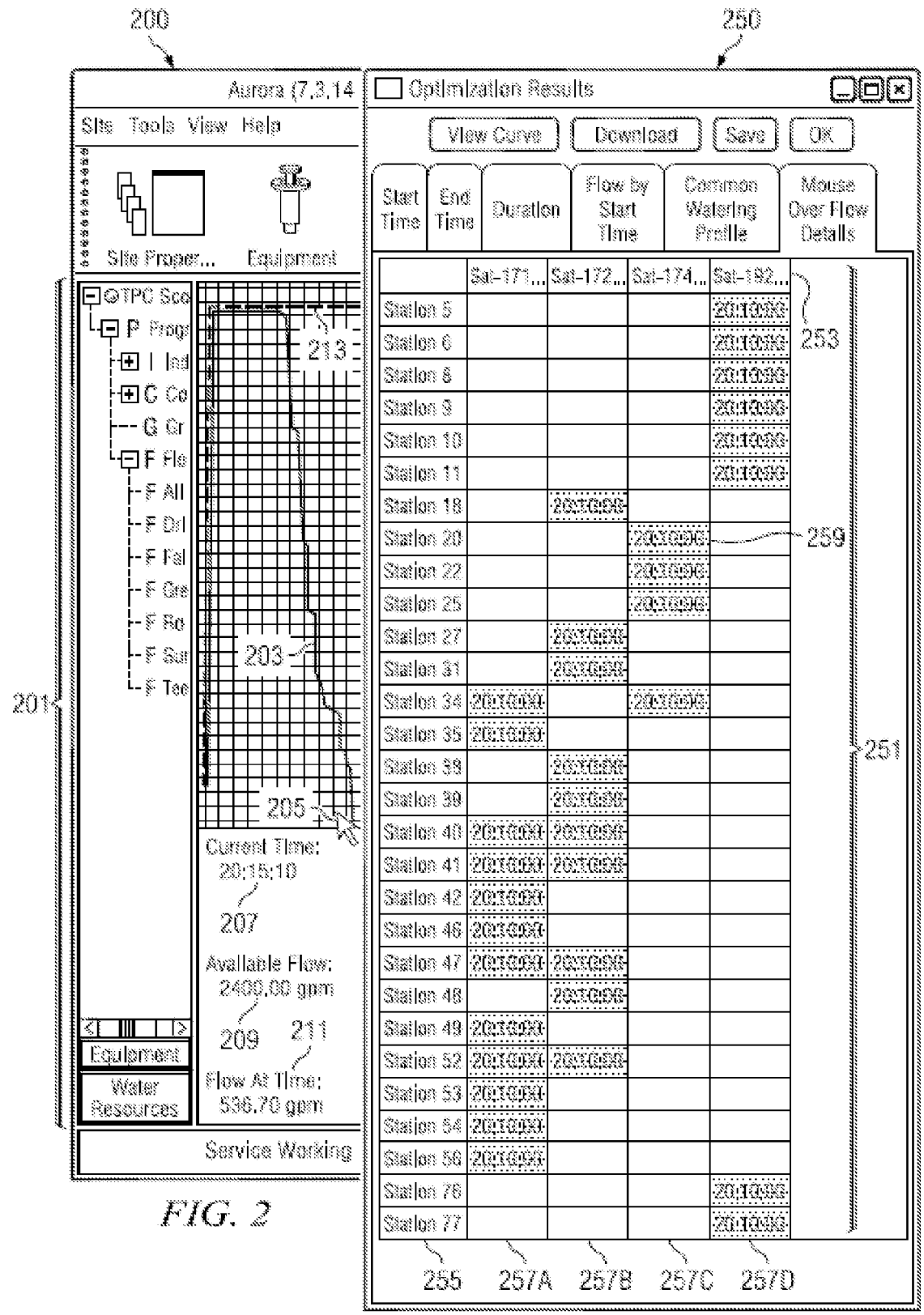
FIG. 2 is an illustration of a user interface.
Figure 3:
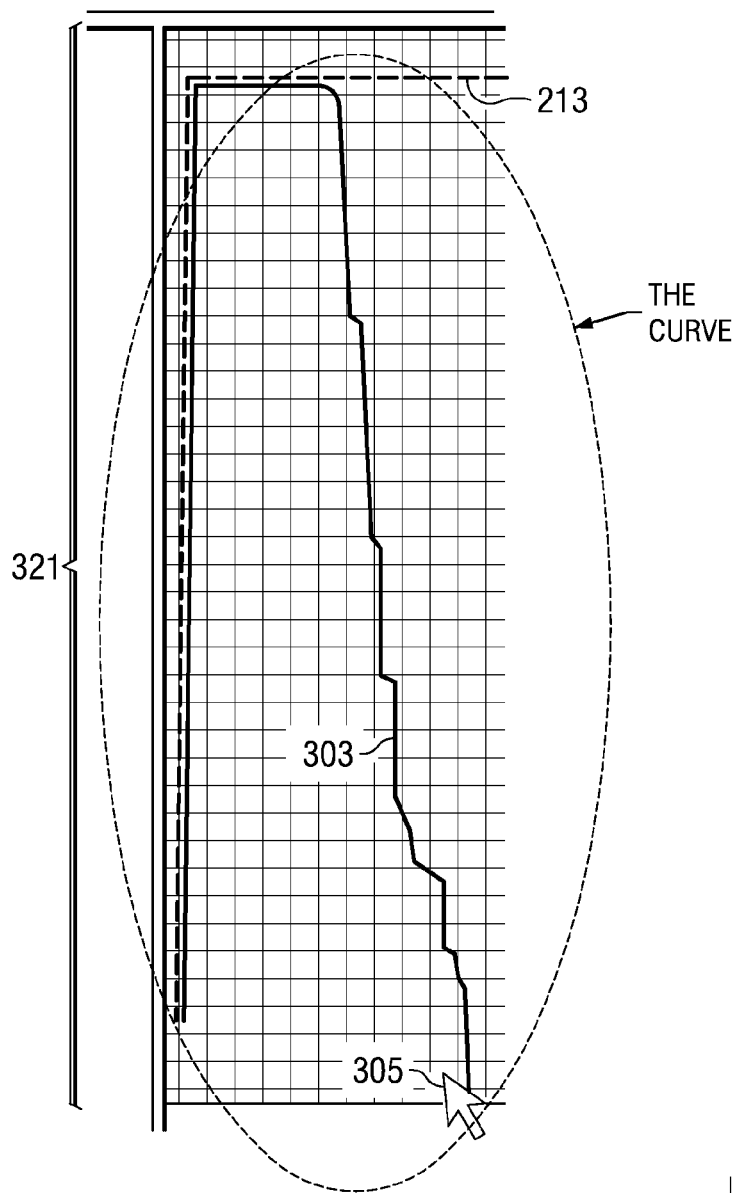
FIG. 3 is an illustration of a flow curve portion of the user interface in FIG. 2.
Figure 4:
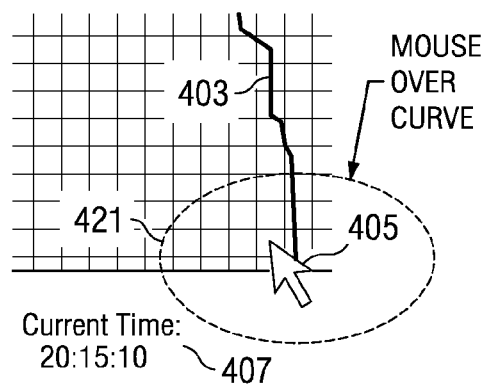
FIG. 4 is an illustration of a close-up of the flow curve portion illustrating a mouse-over of a flow curve area of FIG. 3.

FIG. 2, FIG. 3, FIG. 4 and FIG. 5 provide examples of a user interface. FIG. 2 provides an overall example with a flow curve display and a detail information display. FIG. 3 provides a close up of FIG. 2 showing details of the flow curve image. FIG. 4 provides a close up of FIG. 3 showing details of a mouse-over on the flow curve image. FIG. 5 shows the results of performing the mouse-over on the flow curve image on FIG. 4. Each of these figures is discussed below.

Referring now to FIG. 2, an illustration of a user interface will be discussed and described. FIG. 2 provides an overall example with a flow curve display 200 and a detail information display 250.

The flow curve display includes a display 201 with an irrigation flow curve image 203, an available flow curve image 213, and a position 205 pointed at by a user interface pointing device (shown in this example by an arrow). The flow curve display optionally includes information relating to the position 205 pointed at, for example, current time information 207 for the selected position, available flow information 209 for the selected information, and flow at the current time 211 of the selected position.

The irrigation flow curve image 203 shows irrigation activity. The available flow curve image 213 shows available water. A grid can be included in the flow curve display, with one axis being a measurement of flow such as gpm (gallons per minute) and the other axis being time. In this example, the x-axis is time. Accordingly, the position 205 of the pointing device along the x-axis indicates the time to which the pointing device points. In this example, the current time 207 is 20:15:10, the available flow 209 is 2400.00 gpm, and the flow at the time 211 is 536.70 gpm.

Available flow can be calculated for the irrigation system in accordance with known techniques, for example, by determining maximum pump capacity. The flow curve can be calculated for the irrigation system in accordance with known techniques, for example, by referring to the irrigation schedule and known flow for the individual stations. In the illustrated irrigation system, the irrigation activity is intended to be optimized to be a maximum possible when the available flow begins, so that the entire irrigation system is actively irrigating in the shortest time possible as soon as there is available flow.

The detail information display 250 can be provided when the position 205 on the flow curve 203 is pointed at by the user interface pointing device, in order to isolate what was running at the time corresponding to the position 205 of the user interface pointing device. The detail information display 250 provides detail information for simultaneously active stations, that is, stations that are active at the time corresponding to the selected position. The detail information display 250 indicates active stations 255, irrigation satellites 257A-257D, unique irrigation satellite controller names such as "Sat-192 Hol..." 253, and irrigation start time such as "20:10:00" 259. The irrigation start time can be scheduled time, or alternatively can be actual time (for example, if retrieved from an irrigation system device such as a pump). Alternative information for the individual active stations can be displayed instead of or in addition to start time, for example, flow, duration, and/or end time.

Consequently, for a specific period of time, a user can determine which stations are active, which irrigation controllers are active, and the start time of the irrigation for the active stations, for when the sprinkler heads on that irrigation satellite start sprinkling. For example, a manager can then determine what is happening with the irrigation system, such as which stations are lagging and can be adjusted.

According to one or more embodiments, the detail information includes start time and watering duration for the stations in the irrigation system, and the stations which are simultaneously active at the time are determined from the start time and watering duration in the detail information.

Referring now to FIG. 3, an illustration of a flow curve portion of the user interface in FIG. 2 will be discussed and described. FIG. 3 illustrates a display 321 with an irrigation flow curve image 303. The flow curve image 303 in this illustration is provided as a close up of FIG. 2, to illustrate a position 305 pointed at by the user interface pointing device.

Referring now to FIG. 4, an illustration of a close-up of the flow curve portion illustrating a mouse-over of a flow curve area of FIG. 3 will be discussed and described. Here, the user interface pointing device causes the position 405 of the pointer to hover within a flow curve area of a flow curve image 403. When the position 405 is within the flow curve area, the time indicated by the position of the user interface pointing device corresponding to that portion of the flow curve image 403 is determined, and a display with the detail information is provided for the time.

Referring now to FIG. 5, an illustration of a detail information portion of the user interface of FIG. 2 will be discussed and described. FIG. 5 shows a display 500 resulting from performing the mouse-over on the flow curve image of FIG. 4, and isolates the irrigation stations that were active at the time corresponding to the position of the user interface pointing device. A detail information display 500 provides detail information for simultaneously active stations, that is, stations that are active at the time corresponding to the selected position. The detail information display 500 indicates active stations 555, irrigation satellites 557A-257D, unique irrigation satellite controller names 553, and irrigation start time 559.

The detail information display 500 can be provided as part of an active station/satellite grid 551, wherein the numbers of active stations are displayed in a column (since each irrigation satellite conventionally numbers its stations in the same consecutive order), and the unique names of active irrigation satellites are displayed in a row. The grid 551 is compressed to omit inactive station numbers and satellites, that is, a number of a station is omitted unless there is at least one active station with that number, and a name of a satellite with no active station is omitted. In the illustrated detail information display 500, for example, station numbers 1-4, 7, 12-17, 19, 21, 23, 24, 26, 18-30, 32, 33, 36, 37, 43-45, 50, 51, 55, 57-75, and 78-80 are omitted since none of the active stations are these station numbers. Also, satellites 1-170, 173, 175-191, and 193 up are omitted since none of these satellites have active stations. The station or satellite might be inactive per the watering schedule and/or since there is no such station or satellite configured in the irrigation system.

Accordingly, the irrigation activity individually indicated by the detail information can be indications of the start time for each of the stations which are simultaneously active at the time, the stations can be grouped on the display by individual satellites, and the stations which are not simultaneously active can be omitted from the display.

Figure 6:
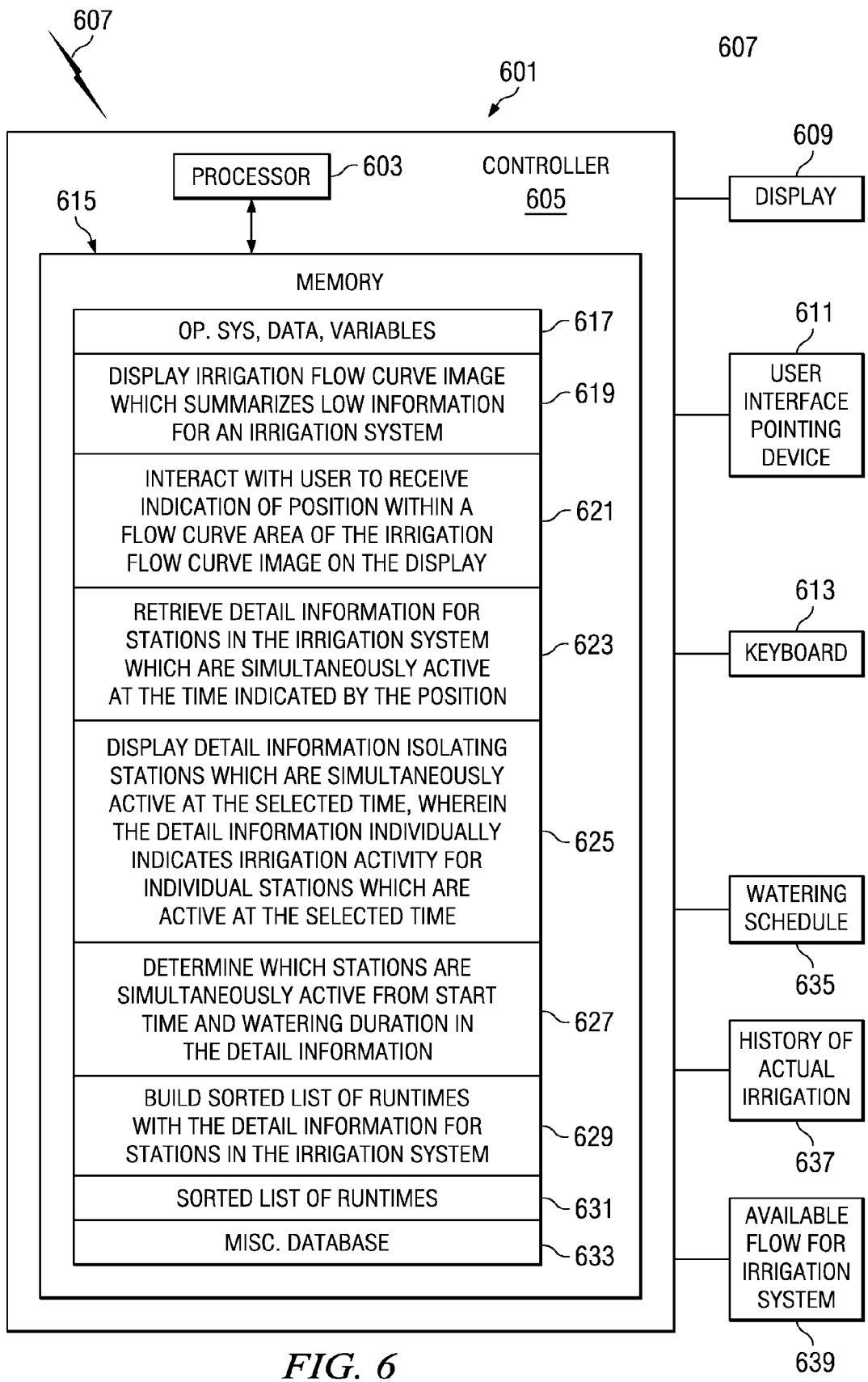
FIG. 6 is a block diagram illustrating portions of a computer system.

Referring now to FIG. 6, a block diagram illustrating portions of a computer system will be discussed and described. The computer system 601 may include one or more controllers 605, and can transmit and receive communications 607. The controller 605 as depicted generally includes a processor 603 and a memory 615, and may include other functionality not illustrated for the sake of simplicity. The irrigation controller may further include, e.g., a text and/or image display 609, a user interface pointing device 611 (such as a mouse, track ball, light pen, touch pad, or similar), and/or a user input device such as a keyboard 613.

The processor 603 may comprise one or more microprocessors and/or one or more digital signal processors. The memory 615 may be coupled to the processor 603 and may comprise a read-only memory (ROM), a random-access memory (RAM), a programmable ROM (PROM), and/or an electrically erasable read-only memory (EEPROM). The memory 615 may include multiple memory locations for storing, among other things, an operating system, data and variables 617 for programs executed by the processor 603; computer programs for causing the processor to operate in connection with various functions such as displaying 619 an irrigation flow curve image which summarizes flow information for an irrigation system, interacting 621 with a user to receive an indication of a position within a flow curve area of the irrigation flow curve image on the display, retrieving 623 detail information for stations in the irrigation system which are simultaneously active at the time indicated by the position, displaying 625 detail information isolating stations which are simultaneously active at the selected time, determining 627 which stations are simultaneously active, and building 629 a sorted list of runtimes with the detail information for stations in the irrigation system; a sorted list of runtimes 631; and a database 633 for other information used by the processor 603 such as maximum pump capacity information. The computer programs may be stored, for example, in ROM or PROM and may direct the processor 603 in controlling the operation of the computer system 601.

The processor 603 can be programmed for displaying 619 an irrigation flow curve image that summarizes flow information for an irrigation system. In particular, the irrigation flow curve shows total activity for individual stations in the irrigation system as a whole at each point in time.

Further, the processor 603 can be programmed for interacting 621 with a user to receive an indication of a position within a flow curve area of the irrigation flow curve image on the display. Specifically, the processor 603 can use known techniques to receive indications of position from the user interface pointing device 611. A maneuver of the user interface pointing device which results in a position (for example, moving the pointer arrow) is commonly referred to as a "mouse-over." Using the position, the processor 603 can determine whether the position is within a flow curve area of the irrigation flow curve image on the display.

The processor 603 can be programmed for retrieving 623 detail information for stations in the irrigation system which are simultaneously active at the time indicated by the position, if the position is within a flow curve area of the irrigation flow curve image. Conveniently, the detail information can be provided in a sorted list by runtimes, wherein the runtimes are per period of time in which the stations and irrigation satellites are active. The detail information can include, for example, start time, stop time, duration, irrigation satellite name, station number, and optionally rate of flow.

In addition, the processor 603 can be programmed for displaying 625 detail information so as to isolate the stations which are simultaneously active at the selected time. That is, the detail information can be provided individually for each individual station which is active or controllers with one or more active stations at the selected time, but is not provided for stations which are not active or controllers with no active stations at the selected time.

The processor 603 also can be programmed for determining 627 which stations are simultaneously active. Particularly, the detail information can be provided in the sorted list by runtimes, so that the list can be indexed by or searched for the selected time, thereby providing the detail information for stations which have the same runtime(s).

Furthermore, the processor 603 can be programmed for building 629 a sorted list of runtimes 631 with the detail information for stations in the irrigation system. The sorted list of runtimes 631 can be built on the fly each time the user desires to display the irrigation flow curve, or can be built when irrigation schedules are updated and stored, or at other convenient intervals. For example, a watering schedule 635 or a history of actual irrigation 637 can be obtained, run times can be determined for each period of irrigation activity for a particular irrigation station, records having the run times and the detail information can be stored in a list of runtimes, and the list can be sorted by runtime to provide the sorted list of runtimes 631. Accordingly, a sorted list of runtimes can be built with the detail information for the stations in the irrigation system, wherein the irrigation flow curve image is prepared from the sorted list of runtimes, and the detail information is retrieved from the sorted list of runtimes running during the time indicated by the position of the user interface pointing device.

Accordingly, the irrigation flow curve image can indicate scheduled flow vs. time, wherein the detail information is a watering schedule of planned irrigation per station, the stations which are simultaneously active at the time being determined by referring to the watering schedule of planned irrigation. Alternatively, the irrigation flow curve image can indicate actual flow vs. time, wherein the detail information is a history of actual irrigation per station, the stations which are simultaneously active at the time being determined by referring to the actual irrigation.

In addition, note that the processor 603 can also calculate available flow for the entire irrigation system, by utilizing stored available flow data 639. Known techniques can be used for calculating available flow.

The display 609 may present information to the user by way of a conventional liquid crystal display (LCD) and/or other visual display. The user may invoke functions, such as interacting with the processor 603, through the user input device keyboard 613 (as illustrated) or keypad, and/or the user interface pointing device 611. The user interface pointing device 611 can comprise one or more of various known input devices, such as a computer mouse, a touchpad, a touch screen, a light stick, a thumb wheel, and/or a trackball or the like.

Instructions for implementing some of the foregoing can be provided on various computer-readable mediums. Accordingly, one or more embodiments can provide a computer-readable medium comprising instructions for execution by a computer, the instructions for implementing a computer-implemented method for providing information about stations in an irrigation system which are simultaneously active. For example, all or part of the instructions can be provided in any appropriate electronic format, including, for example, provided over a communication line as electronic signals, or on computer-readable storage mediums such as on floppy disk, CD ROM, optical disk memory, computer chips, or the like.

FIG. 7, FIG. 8 and FIG. 9 are provided to illustrate starting with a conventional watering schedule to build a sorted list of runtimes. FIG. 7 illustrates an example watering schedule used for part of the irrigation flow curve and detail information of FIG. 2. FIG. 8 and FIG. 9 are different selections from the sorted list of runtimes developed from the watering schedule of FIG. 7, with FIG. 8 illustrating the grouping of stations by runtime, and FIG. 9 illustrating the granularity of the runtimes.

Referring now to FIG. 7, an illustration of part of a watering schedule relating to the user interface of FIG. 2 will be discussed and described. This watering schedule is a simplified representative version of a typical conventional watering schedule, and indicates each station (specified by satellite number (or name) and station number) as well as, for each station, an irrigation start time, irrigation end time, and irrigation duration. The end time or duration can be omitted, if preferred. The watering schedule is in order by satellite number, and then by station number for each satellite. Most of the watering schedule has been omitted for ease of illustration, as indicated by the use of ellipses ( . . . ).

Note that sorting the watering schedule by start time, end time, duration, or any combination thereof will not yield a sorted list group together all of the simultaneously active stations. For example, sorting the illustrated watering schedule by start time would group together stations #36 and 38 which both start at 20:20:00, even though by 20:25:01, station #38 is no longer active; and station #36 would not be grouped with stations #37 and 39 which are all simultaneously active from at least 20:25:00 until 20:30:00.

Referring now to FIG. 8, an illustration of a list of runtimes for the watering schedule will be discussed and described. This list of runtimes is built from the watering schedule of FIG. 7, although most of the list has been omitted for ease of illustration, as indicated by the use of ellipses. The runtime(s) for a particular station list each period of runtime, for the selected time granularity, in which the particular station is actively irrigation. In this illustration, the time granularity is one second. A portion of the list is shown for the runtime of 20:15:00.

Referring now to FIG. 9, another illustration of the list of runtimes for the watering schedule will be discussed and described. This is the same list of runtimes illustrated in FIG. 8, although other portions of the list are omitted, as indicated by ellipses. Consider Satellite #171, Station #34 and Station #35 which both have a start time of 20:10:00, end time of 20:20:00 and duration of 10:00. The runtimes for these stations are 20:10:00, 20:10:01, 20:10:02, . . . 20:20:00. Furthermore, sorting the list by runtime conveniently results in grouping together the stations which are simultaneously active. Such a sorted list can easily be searched or indexed by runtime, and consequently is conducive for use in connection with providing details by mouse-over, or similar.

Figure 10:
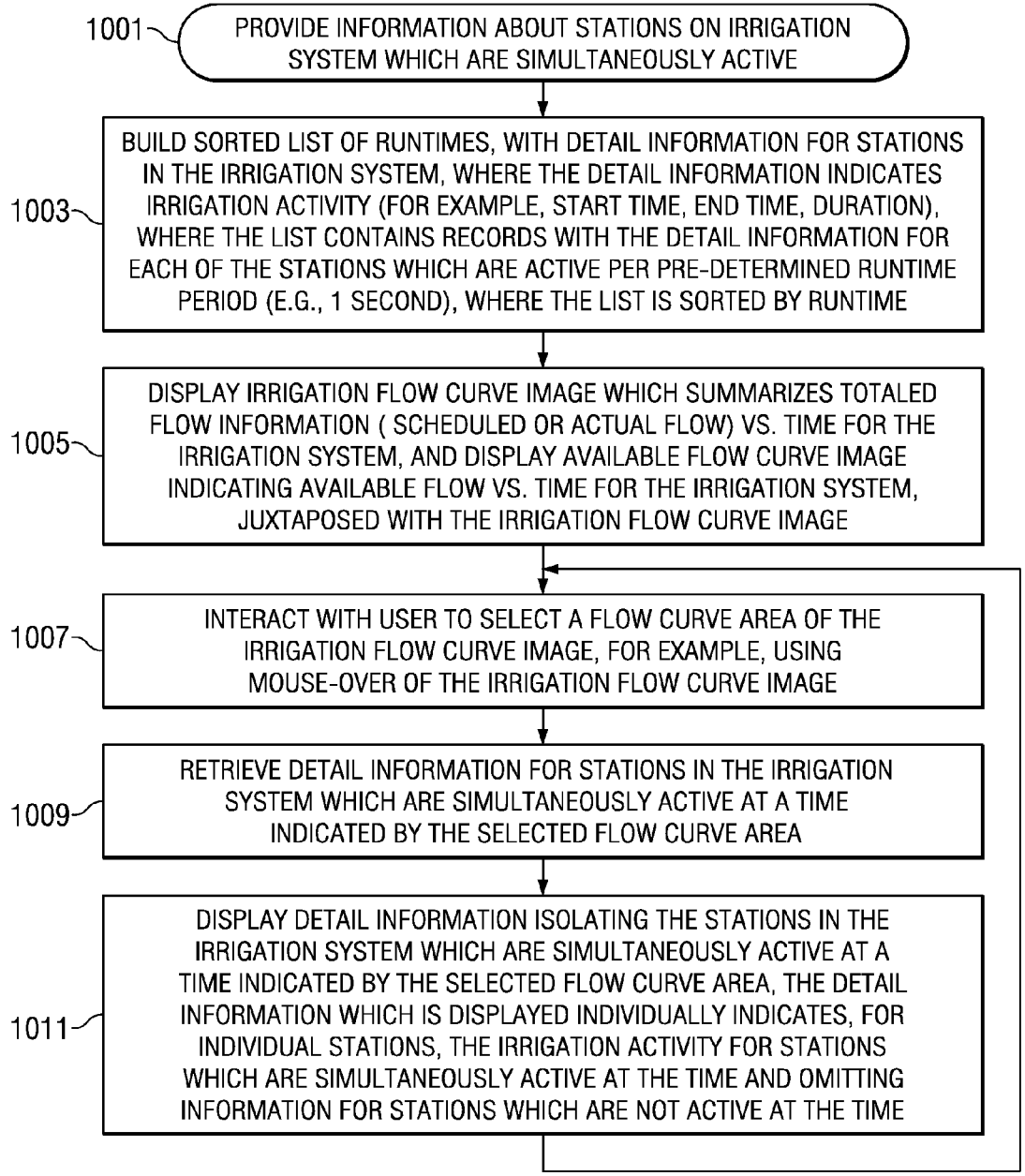
FIG. 10 is a flow chart illustrating an exemplary procedure for providing information about stations on an irrigation system that are simultaneously active.

Referring now to FIG. 10, a flow chart illustrating an exemplary procedure for providing information about stations on an irrigation system that are simultaneously active will be discussed and described. The procedure can advantageously be implemented on, for example, a processor of a computer system, such as described in connection with FIG. 6 or other apparatus appropriately arranged. However, it should be understood that the functionality illustrated in FIG. 10 can be distributed in a variety of combinations between various equipment in an irrigation system such as a central computer, a hand-held device, a computer not in communication with the irrigation system, and such combinations are encompassed in the scope herein. Much of the functionality in FIG. 10 has been disclosed previously, and accordingly will not be repeated below.

In the procedure 1001 for providing information about stations on an irrigation system, where the stations are simultaneously active, the procedure 1001 first builds 1003 a sorted list of runtimes, with detail information for stations in the irrigation system. The detail information indicates irrigation activity, such as start time, end time, and duration. The runtime list can contain records with the detail information for each of the stations that are active per pre-determined runtime period (for example, one second). The runtime list can be sorted by runtime, and consequently can be readily indexed or searched to accurately indicate which stations are simultaneously active during any particular runtime period.

The procedure 1001 can display 1005 an irrigation flow curve image. The irrigation flow curve image provides a summary of totaled flow information (that is, scheduled flow or actual flow) vs. each pre-determined runtime period for the irrigation system. Additionally, an available flow curve image can be displayed, where the available flow curve image indicates total available flow information for each pre-determined runtime period. Advantageously, the irrigation flow curve image can be juxtaposed against the available flow curve image. Accordingly, an available flow curve image can be displayed indicating available flow for the irrigation system vs. time juxtaposed on the display with the irrigation flow curve image.

Then, the procedure 1001 can interact 1007 with the user to select a flow curve area of the irrigation flow curve image. The foregoing discussion provides examples of using a user interface pointing device, for example, using a mouse-over of the irrigation flow curve image, to indicate a selected position on the irrigation flow curve image.

When the selected time is indicated by the position of the user interface pointing device in a selected flow curve area, then the procedure 1001 retrieves 1009 detail information for stations in the irrigation system which are simultaneously active at the selected time within the selected flow curve area. The detail information can be readily retrieved from the sorted list of runtimes.

The procedure 1001 then can display 1011 the detail information so as to isolate the stations in the irrigation system which are simultaneously active at the selected time. The detail information can be displayed in another window, another table, or the like. The detail information which is displayed individually indicates, for individual stations which are active at the selected time, the irrigation activity, and can omit detail information for stations which are not active at the selected time. Thus, the display of detail information for stations which are simultaneously active has a user-friendly effect of packing the relevant information together, so that the user can easily study the relevant detail information and more easily manage irrigation such as by adjusting a watering schedule.

The procedure 1001 can continue to repeatedly interact 1007 with the user to select a flow curve area, retrieve detail information for stations which are active at the time of the selected flow curve area, and display detail information isolating those stations which are active at the time of the selected flow curve area.

Accordingly, one or more embodiments provides for a method, implemented on a computer, for providing information about stations in an irrigation system which are simultaneously active. The method includes, on a display of a computer, displaying an irrigation flow curve image which summarizes flow information for an irrigation system. The method also includes interacting with a user to receive an indication from a user interface pointing device of a position within a flow curve area of the irrigation flow curve image on the display. Also included is retrieving detail information for stations in the irrigation system which are simultaneously active at a time indicated by the position of the user interface pointing device. The method also includes, on the display of the computer, displaying detail information isolating the stations in the irrigation system which are simultaneously active at the time indicated by the position of the user interface pointing device, wherein the detail information further individually indicates irrigation activity for stations which are simultaneously active at the time indicated by the position of the user interface pointing device.

Furthermore, one or more embodiments provides a computer system with a display operative to receive screens to be displayed to a user, a user interface pointing device operable to indicate a position on the display, and a processor cooperatively operable with the display and the user interface pointing device, wherein the processor is configured to facilitate the foregoing method. In addition, one or more embodiments provides a computer-readable storage medium comprising instructions being executed by a computer, the instructions including a computer implemented embodiment for implementing the foregoing method.

One or more embodiments have been illustrated in simplified format. The illustrations are intended as examples, and will be understood to include equivalents. Further, it is not intended to limit the claims to the particular number of irrigation satellites or irrigation stations illustrated, or the particular networks illustrated. One or more embodiments of the present invention may operate in connection with various other combinations of the same, and/or equivalents thereof.

The term "station" or "irrigation station," sometimes referring to in the industry as "watering station", is used herein to mean a device which is a specific group of sprinklers; when the station is activated, all of the sprinklers respond as a unit and become active. Typically, an irrigation station includes sprinklers co-located in a limited geographic area. A wide variety of irrigation stations are conventionally available.

The term "irrigation satellite", sometimes referred to in the industry as a "satellite controller", is used herein to denote various devices used to turn on and off irrigation stations in an automatic irrigation system, and variants or evolutions thereof. Irrigation satellites typically are devices that can be very simple to extremely sophisticated computerized devices that can utilize wireline and/or wireless communication between the irrigation satellite, the stations being controlled, and computer systems. A wide variety of irrigation satellites are conventionally available.

The term "irrigation system", as used herein, means a networked collection of irrigation satellites and the irrigation stations on those irrigation satellites, on which irrigation is coordinated by irrigation schedules, usually in relation to an area to be irrigated such as a golf course, a park, a turf area, an agricultural area, and the like.

The phrase "simultaneously active" is used herein to indicate irrigation stations or irrigation satellites, as appropriate, are providing irrigation at the same time period, and can include irrigation stations which have different start times, the same start times, different durations, the same durations, different stop times, and/or the same stop times, provided that the irrigation stations (or at least one irrigation station on the satellite) are providing irrigation during the same relevant time period.

"Irrigation flow curve" as used herein specifically designates a curve (smooth or not smoothed), bar chart, histogram, line charts, or the like that maps total irrigation flow for the whole irrigation system against time, thereby summarizing "flow information" (as used herein) for an irrigation system. The idea behind optimizing an irrigation flow curve is to start irrigation in the irrigation system at a prescribed time and pack as much irrigation as possible into a period of time up to but not exceeding the maximum amount of available flow for that period of time. "Available flow curve" denotes a curve (smooth or not smoothed), bar chart, histogram, line charts, or other graphic that maps total available flow for the whole irrigation system against time. The time used for either the irrigation flow curve or available flow curve has a pre-defined granularity, for example one second or one minute. Images of the irrigation flow curve and the available flow curve can be displayed together, whereby they are juxtaposed on the same display, which advantageously can include a grid. Known techniques can be utilized for calculating an irrigation flow curve and an available flow curve.

The term "image" is used herein specifically to indicate the image as it is displayed on a display. Known techniques are available for determining the appearance of the image.

The designation "flow curve area" means the portion of the display on or within the flow curve image. For example, if the x-axis is time and the y-axis is irrigation flow, then the flow curve area at particular time "t" includes points (x, y) on the display where x="t" and y≤"F" (or y="F"), where "t"=particular time and "F"=irrigation flow at time "t". Techniques are known for calculating the x, y position on a display indicated by a user interface pointing device in relation to a displayed image.

The designation "detail information" is intended to encompass information that is specific to a particular irrigation station or irrigation satellite, for example irrigation activity (such as start time, stop time, runtime, and flow volume), identification of the particular irrigation station or irrigation satellite, and collections of such information, provided that the information is specific to a particular irrigation station or irrigation satellite. Detail information can be provided in various formats, such as a watering schedule, a history of actual irrigation, or a list of runtimes.

The term "runtime" is used herein to designate a predetermined period of time during which an irrigation station or irrigation satellite is active, that is, providing irrigation; there may be one or plural consecutive runtimes between the start time and the stop time for a particular irrigation station or irrigation satellite. For example, if the granularity of the predetermined period of time is one second and the irrigation station or irrigation satellite is has a start time of 12:00:00 and stop time of 12:05:00, then the irrigation station or irrigation satellite has three-hundred consecutive runtimes of 12:00:00, 12:00:01, 12:00:02, . . . 12:04:59.

The designation "watering schedule" or "irrigation schedule" as used herein, is a schedule of planned irrigation for the irrigation system, which indicates start time and stop time or duration for each irrigation satellite/controller in the irrigation system. A wide variety of conventional techniques are known for calculating and adjusting an irrigation schedule taking into consideration different factors such as season, evapo-transpiration, type of crop/turf, and the like. Conventional techniques call for loading an irrigation schedule onto a conventional irrigation system, for example, a central computer and/or irrigation satellites, which will operate the irrigation stations according to the irrigation schedule.

The designation "history of actual irrigation" is used to indicate actual start and stop time or duration per station, and can be obtained from pumps and/or the irrigation satellites in the irrigation system.

"Irrigation activity" is used herein generally to indicate start time, stop time, and/or duration of irrigation.

The term "computer system" is used herein to denote various devices such as general purpose computers, personal computers, handheld and/or portable computer devices, or the like, which can utilize wireline and/or wireless communication, e.g., modems, cellular telephones, and/or radios and allow communication between the computer system and irrigation system. The computer system can communicate with other computers, according to various embodiments, e.g., another computer having the watering schedules.

What is claimed is:

1. A method, implemented on a computer, for providing information about stations in an irrigation system which are simultaneously active, comprising:
   on a display of a computer, displaying an irrigation flow curve image which summarizes flow information for an irrigation system:
      wherein the irrigation flow curve image indicates scheduled flow vs. time,
      wherein the detail information is a watering schedule of planned irrigation per station, the stations which are simultaneously active at the time being determined by referring to the watering schedule of planned irrigation;
   interacting with a user to receive an indication from a user interface pointing device of a position within a flow curve area of the irrigation flow curve image on the display;
   determining which stations in the irrigation system are simultaneously active throughout a same runtime corresponding to a time indicated by the position of the user interface pointing device, as distinguished from a station which has inactivity at a point in the same runtime; and
   on the display of the computer, displaying detail information isolating the stations in the irrigation system determined to be simultaneously active throughout the same runtime corresponding to the time indicated by the position of the user interface pointing device, wherein the detail information further individually indicates irrigation activity for the stations determined to be simultaneously active at the time indicated by the position of the user interface pointing device, and the stations being grouped on the display by individual satellites, the stations which are not simultaneously active being omitted from the display.

2. The method of claim 1, wherein the detail information includes start time and watering duration for the stations in the irrigation system, and wherein the stations which are simultaneously active at the time are determined from the start time and watering duration in the detail information.

3. The method of claim 1, further comprising displaying an available flow curve image indicating available flow for the irrigation system vs. time juxtaposed on the display with the irrigation flow curve image.

4. The method of claim 1, further comprising building a sorted list of runtimes with the detail information for the stations in the irrigation system, the stations being grouped together in the list chronologically by runtimes, wherein
   the irrigation flow curve image is prepared from the sorted list of runtimes,
   the detail information is retrieved from the sorted list of runtimes running during the time indicated by the position of the user interface pointing device.

5. A computer, comprising:
   a display operable to receive screens to be displayed to a user;
   a user interface pointing device operable to indicate a position on the display; and
   a processor cooperatively operable with the display and the user interface pointing device, and configured to facilitate providing information about stations in an irrigation system which are simultaneously active, comprising:
      displaying, on the display, an irrigation flow curve image which summarizes flow information for an irrigation system:
         wherein the irrigation flow curve image indicates scheduled flow vs. time,
         wherein the detail information is a watering schedule of planned irrigation per station, the stations which are simultaneously active at the time being determined by referring to the watering schedule of planned irrigation;
      interacting with a user to receive an indication from the user interface pointing device of a position within a flow curve area of the irrigation flow curve image on the display;
      determining which stations in the irrigation system are simultaneously active throughout a same runtime corresponding to a time indicated by the position of the user interface pointing device, as distinguished from a station which has inactivity at a point in the same runtime; and on the display of the computer, displaying detail information isolating the stations in the irrigation system determined to be simultaneously active throughout the same runtime corresponding to the time indicated by the position of the user interface pointing device, wherein the detail information further individually indicates irrigation activity for the stations determined to be simultaneously active at the time indicated by the position of the user interface pointing device, and the stations being grouped on the display by individual satellites, the stations which are not simultaneously active being omitted from the display.

6. The computer system of claim 5, wherein the detail information includes start time and watering duration for the stations in the irrigation system, and wherein the stations which are simultaneously active at the time are determined from the start time and watering duration in the detail information.

7. The computer system of claim 5, further comprising displaying an available flow curve image indicating available flow for the irrigation system vs. time juxtaposed on the display with the irrigation flow curve image.

8. The computer system of claim 5, further comprising building a sorted list of runtimes with the detail information for the stations in the irrigation system, the stations being grouped together in the list chronologically by runtimes, wherein the irrigation flow curve image is prepared from the sorted list of runtimes, the detail information is retrieved from the sorted list of runtimes running during the time indicated by the position of the user interface pointing device.

9. A non-transitory computer-readable storage medium comprising instructions being executed by a computer, the instructions including a computer-implemented method for providing information about stations in an irrigation system which are simultaneously active, the instructions for implementing:

on a display of a computer, displaying an irrigation flow curve image which summarizes flow information for an irrigation system:

wherein the irrigation flow curve image indicates scheduled flow vs. time, wherein the detail information is a watering schedule of planned irrigation per station, the stations which are simultaneously active at the time being determined by referring to the watering schedule of planned irrigation;

interacting with a user to receive an indication from a user interface pointing device of a position within a flow curve area of the irrigation flow curve image on the display;

determining which stations in the irrigation system are simultaneously active throughout a same runtime corresponding to a time indicated by the position of the user interface pointing device, as distinguished from a station which has inactivity at a point in the same runtime; and on the display of the computer, displaying detail information isolating the stations in the irrigation system determined to be simultaneously active throughout the same runtime corresponding to the time indicated by the position of the user interface pointing device, wherein the detail information further individually indicates irrigation activity for stations which are simultaneously active at the time indicated by the position of the user interface pointing device, and the stations being grouped on the display by individual satellites, the stations which are not simultaneously active being omitted from the display.

10. The non-transitory computer-readable storage medium of claim 9, wherein the detail information includes start time and watering duration for the stations in the irrigation system, further comprising determining the stations which are simultaneously active at the time from the start time and watering duration in the detail information.

11. The non-transitory computer-readable storage medium of claim 9, further comprising instructions for displaying an available flow curve image indicating available flow for the irrigation system vs. time juxtaposed on the display with the irrigation flow curve image.

12. The non-transitory computer-readable storage medium of claim 9, further comprising instructions for building a sorted list of runtimes with the detail information for the stations in the irrigation system, the stations being grouped together in the list chronologically by runtimes, wherein the irrigation flow curve image is prepared from the sorted list of runtimes, the detail information is retrieved from the sorted list of runtimes running during the time indicated by the position of the user interface pointing device.

* * * * *